United States Patent
Li et al.

(10) Patent No.: US 10,118,498 B2
(45) Date of Patent: Nov. 6, 2018

(54) POWER SUPPLY SYSTEM FOR ELECTRIC VEHICLE AND METHOD FOR CONTROLLING THE SAME

(71) Applicant: BYD COMPANY LIMITED, Shenzhen, Guangdong (CN)

(72) Inventors: Longfei Li, Guangdong (CN); Shulin Liang, Guangdong (CN); Xiaohua Tang, Guangdong (CN)

(73) Assignee: BYD COMPANY LIMITED, Shenzhen, Guangdong (CN)

( * ) Notice: Subject to any disclaimer, the term of this patent is extended or adjusted under 35 U.S.C. 154(b) by 427 days.

(21) Appl. No.: 14/778,849

(22) PCT Filed: Mar. 21, 2014

(86) PCT No.: PCT/CN2014/073814
§ 371 (c)(1),
(2) Date: Sep. 21, 2015

(87) PCT Pub. No.: WO2014/146596
PCT Pub. Date: Sep. 25, 2014

(65) Prior Publication Data
US 2016/0039304 A1 Feb. 11, 2016

(30) Foreign Application Priority Data
Mar. 21, 2013 (CN) .................. 2013 2 0131291 U

(51) Int. Cl.
*B60L 11/18* (2006.01)
*H02J 1/06* (2006.01)
(Continued)

(52) U.S. Cl.
CPC ............. *B60L 11/1851* (2013.01); *B60L 1/00* (2013.01); *B60L 1/10* (2013.01); *B60L 3/0092* (2013.01);
(Continued)

(58) Field of Classification Search
CPC ..... B60L 1/00; B60L 11/1857; B60L 2210/00
See application file for complete search history.

(56) References Cited

U.S. PATENT DOCUMENTS 4,479,083 A  10/1984 Sullivan
5,864,221 A   1/1999 Downs et al.
(Continued)

FOREIGN PATENT DOCUMENTS

CN      1897425 A     1/2007
CN    200980040 Y    11/2007
(Continued)

OTHER PUBLICATIONS

International Search Report and Written Opinion dated Jun. 3, 2014 for corresponding International Patent Application No. PCT/CN2014/073814, filed Mar. 21, 2014.

*Primary Examiner* — Rexford Barnie
*Assistant Examiner* — Terrence Willoughby
(74) *Attorney, Agent, or Firm* — David D. Brush; Westman Champlin & Koehler, P.A.

(57) ABSTRACT

A power supply system for an electric vehicle includes a battery module, a first DC/DC converter, a second DC/DC converter, a first switch, a second switch and a third switch. The battery module has a negative electrode, a first positive electrode and a second positive electrode. The first DC/DC converter has an input terminal connected with the second positive electrode. The second DC/DC converter has an input terminal connected with the second positive electrode. The first switch is connected between the second positive electrode and the first DC/DC converter. The second switch is connected between the second positive electrode and the second DC/DC converter. The third switch is connected between the first positive electrode and an output terminal of the second DC/DC converter.

14 Claims, 2 Drawing Sheets

(51) Int. Cl.
  *H02J 7/14* (2006.01)
  *B60L 1/00* (2006.01)
  *B60L 3/00* (2006.01)
  *B60L 3/04* (2006.01)
  *B60L 1/10* (2006.01)

(52) U.S. Cl.
  CPC ............ *B60L 3/04* (2013.01); *B60L 11/1853* (2013.01); *B60L 11/1855* (2013.01); *B60L 11/1866* (2013.01); *H02J 1/06* (2013.01); *H02J 7/1423* (2013.01); *B60L 2210/12* (2013.01); *B60L 2240/526* (2013.01); *Y02T 10/7011* (2013.01); *Y02T 10/7061* (2013.01); *Y02T 10/7233* (2013.01); *Y02T 10/92* (2013.01)

(56) References Cited

U.S. PATENT DOCUMENTS

| | | | |
|---|---|---|---|
| 6,384,489 | B1 | 5/2002 | Bluemel et al. |
| 8,633,677 | B2 | 1/2014 | Kim |
| 9,490,639 | B2* | 11/2016 | Mercier ............... B60L 3/0046 |
| 2004/0243297 | A1* | 12/2004 | Bolz .................... B60R 16/023 701/115 |
| 2007/0018622 | A1 | 1/2007 | Chen |
| 2010/0181829 | A1* | 7/2010 | Ichikawa ............ B60L 11/1861 307/9.1 |
| 2010/0213897 | A1 | 8/2010 | Tse |
| 2010/0264740 | A1* | 10/2010 | Lee ....................... H02J 7/0016 307/80 |
| 2011/0156655 | A1 | 6/2011 | Kim |
| 2012/0013182 | A1 | 1/2012 | Minegishi et al. |
| 2012/0217797 | A1 | 8/2012 | Butzmann |
| 2013/0038289 | A1 | 2/2013 | Tse |

FOREIGN PATENT DOCUMENTS

| | | |
|---|---|---|
| CN | 102110864 A | 6/2011 |
| CN | 201985600 U | 9/2011 |
| CN | 202076821 U | 12/2011 |
| CN | 102414043 A | 4/2012 |
| CN | 202435082 U | 9/2012 |
| CN | 203267806 U | 11/2013 |
| EP | 2367259 A2 | 9/2011 |
| EP | 2548283 A2 | 1/2013 |
| JP | 2001204137 A | 7/2001 |
| JP | 2011139622 A | 7/2011 |
| JP | 2013520947 A | 6/2013 |
| KR | 1020110075364 A | 7/2011 |
| KR | 101097262 B1 | 12/2011 |
| TW | 200711278 A | 3/2007 |
| WO | 2009145709 A1 | 12/2009 |
| WO | 2011103469 A2 | 8/2011 |

* cited by examiner

POWER SUPPLY SYSTEM FOR ELECTRIC VEHICLE AND METHOD FOR CONTROLLING THE SAME

CROSS-REFERENCE TO RELATED APPLICATION

This application is a Section 371 U.S. National Phase Application of International Application No. PCT/CN2014/073814, filed with the State Intellectual Property Office of P. R. China on Mar. 21, 2014, which published as WO 2014/146596 on Sep. 25, 2014, in English and which claims priority to and benefits of Chinese Patent Application No. 201320131291.9, filed with the State Intellectual Property Office of P. R. C. on Mar. 21, 2013, the entire contents of both of which are incorporated herein by reference.

FIELD

Embodiments of the present disclosure generally relate to a power supply system, and more particularly to a power supply system for an electric vehicle and a method for controlling a power supply system for an electric vehicle.

BACKGROUND

The statements in this section merely provide background information related to the present disclosure and may not constitute prior art.

With the development of automobile industry, conflicts between the automobile development and energy and conflicts between the automobile development and environment become increasingly serious.

Generally, lead-acid batteries are connected in parallel in a power supply system of an electric vehicle to supply power. However, during usage of the lead-acid batteries, acid may overflow or seep from the lead-acid batteries, or acid mist may escape from the lead-acid batteries, which may not only cause corrosion of equipments, but also cause air pollution and do harm to the urban environment. Moreover, if workers work very long in this environment, they would suffer from respiratory diseases, which harm human health. In addition, conventional power supply systems for the electric vehicle have disadvantages of high cost, environmental pollution and bad driving experience.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In viewing thereof, the present disclosure is directed to solve at least one of the problems existing in the prior art. Accordingly, a power supply system for an electric vehicle may need to be provided, which may have advantages of low cost, environment-friendliness and good driving experience.

According to embodiments of a first broad aspect of the present disclosure, a power supply system for an electric vehicle is provided. The power supply system for an electric vehicle may include: a battery module, a first DC/DC converter, a second DC/DC converter, a first switch, a second switch and a third switch. The battery module has a negative electrode, a first positive electrode and a second positive electrode, in which the first positive electrode is configured to output a first voltage, the second positive electrode is configured to output a second voltage, and the second voltage is greater than the first voltage. The first DC/DC converter has an input terminal connected with the second positive electrode. The second DC/DC converter has an input terminal connected with the second positive electrode. The first switch is connected between the second positive electrode and the first DC/DC converter. The second switch is connected between the second positive electrode and the second DC/DC converter. The third switch is connected between the first positive electrode and an output terminal of the second DC/DC converter.

According to embodiments of a second broad aspect of the present disclosure, a method for controlling a power supply system for an electric vehicle is provided. The power supply system may include: a battery module having a negative electrode, a first positive electrode and a second positive electrode, in which the first positive electrode is configured to output a first voltage, the second positive electrode is configured to output a second voltage, and the second voltage is greater than the first voltage; a first DC/DC converter having an input terminal connected with the second positive electrode; a second DC/DC converter having an input terminal connected with the second positive electrode; a first switch connected between the second positive electrode and the first DC/DC converter; a second switch connected between the second positive electrode and the second DC/DC converter; and a third switch connected between the first positive electrode and an output terminal of the second DC/DC converter. The method may include: switching on the second switch and switching off the first switch when the electric vehicle is started or running; and switching off the second switch and switching on the first switch when the electric vehicle is stopped.

With the power supply system and the method for controlling the power supply system according to embodiments of the present disclosure, when the second DC/DC converter fails to work, a power-off of the power supply system can be avoided. Furthermore, by providing two DC/DC converters, static losses can be reduced. In other words, the power supply system according to the present disclosure has advantages of high safety and high reliability. In addition, a lithium iron phosphate battery module can be used in the power supply system of the present disclosure, thus increasing an energy density, realizing a high output power, a high temperature resistance, a long service life, non-pollution and low cost, and improving a user's driving experience.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
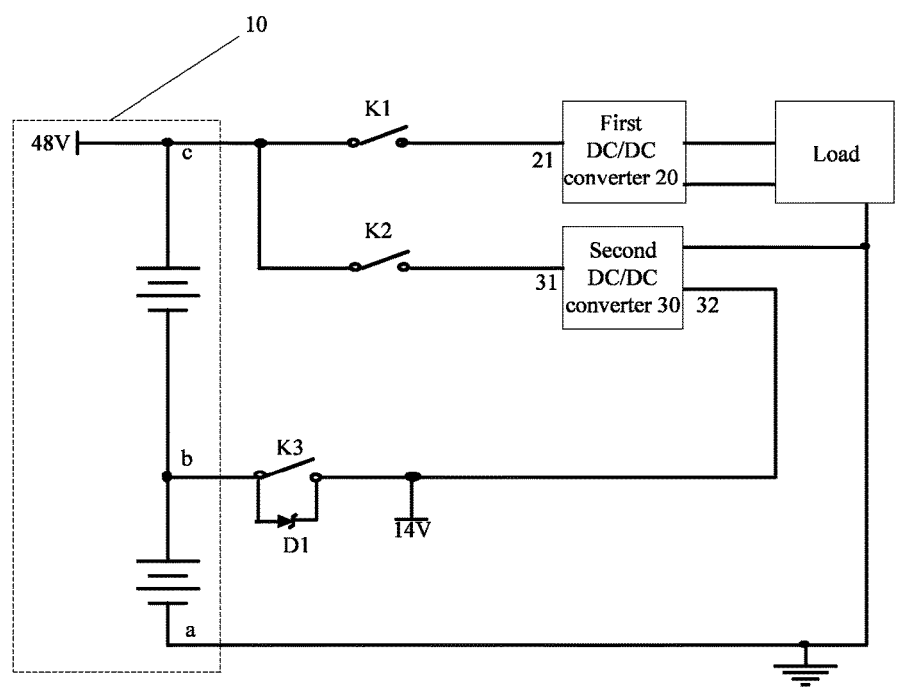
FIG. 1 is a schematic diagram of a power supply system for an electric vehicle according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Referring to the drawings, embodiments of the present disclosure will be described by way of examples only.

Unless specified or limited otherwise, terms concerning attachments, coupling and the like, such as "mounted," "connected," "supported," and "coupled" and variations thereof are used broadly and encompass both direct and indirect mountings, connections, supports, and couplers. Further, "connected" and "coupled" are not restricted to physical or mechanical connections or couplers.

In addition, terms such as "first" and "second" are used herein for purposes of description and are not intended to indicate or imply relative importance or significance.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

In the following, a power supply system for an electric vehicle will be described in detail, in which like numerals refer to like elements through the drawings.

As shown in FIG. 1, a power supply system for an electric vehicle is provided. The power supply system for an electric vehicle may include a battery module 10, a first DC/DC converter 20, a second DC/DC converter 30, a first switch K1, a second switch K2 and a third switch K3. The battery module 10 has a negative electrode a, a first positive electrode b and a second positive electrode c. The first positive electrode b is configured to output a first voltage, the second positive electrode c is configured to output a second voltage, and the second voltage is greater than the first voltage. The first DC/DC converter 20 has an input terminal 21 connected with the second positive electrode c. The second DC/DC converter 30 has an input terminal 31 connected with the second positive electrode c. The first switch K1 is connected between the second positive electrode c and the first DC/DC converter 20. The second switch K2 is connected between the second positive electrode C and the second DC/DC converter 30. The third switch K3 is connected between the first positive electrode b and an output terminal 31 of the second DC/DC converter 30.

In an embodiment, the first voltage is 12V, and the second voltage is 48V.

In an embodiment, the battery module 10 is configured as a lithium iron phosphate battery module. The lithium iron phosphate battery module has advantages of high energy density, high output power, high temperature resistance, long service life and low cost. In addition, the lithium iron phosphate battery module does not contain any heavy metals and rare metals, and is non-toxic and pollution-free, thus being a green and environment-friendly battery. Thus, with the lithium iron phosphate battery module in the power supply system, the energy density of the power supply system can be improved, advantages of non-pollution, low cost, long service life, high temperature resistance, energy conservation and environment protection can be achieved, and the user's driving experience can be improved.

In an embodiment, an operating power of the first DC/DC converter 20 is smaller than an operating power of the second DC/DC converter 30.

In an embodiment, an input voltage of the first DC/DC converter 20 ranges from about 30V to about 60V, and an output voltage of the first DC/DC converter 20 is 14V. An input voltage of the second DC/DC converter ranges from about 30V to about 60V, and the output voltage of the first DC/DC converter is 14V. That is, in the present embodiment, an output voltage of the second DC/DC converter 30 is greater than the first voltage.

Figure 2:
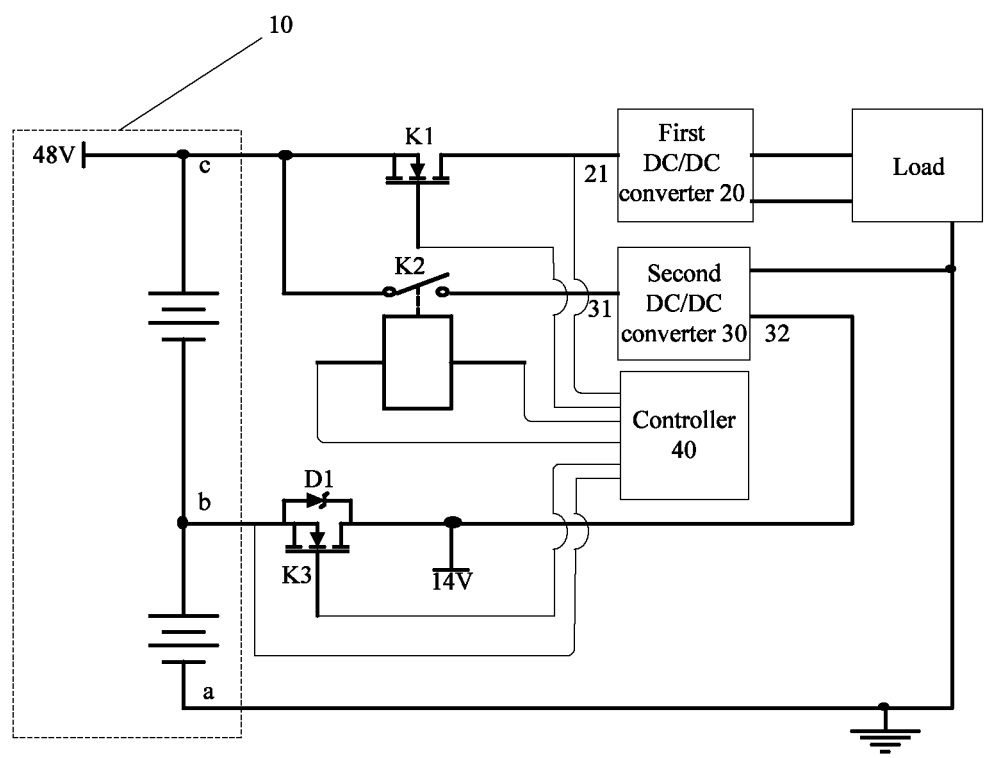
FIG. 2 is a schematic diagram of a power supply system for an electric vehicle according to another embodiment of the present disclosure.

As shown in FIG. 2, in an embodiment, the power supply system may further include a controller 40. The controller 40 is connected with the first switch K1 and the second switch K2 respectively, and configured to switch on the second switch K2 and to switch off the first switch K1 when the electric vehicle is started or running, and to switch off the second switch K2 and to switch on the first switch K1 when the electric vehicle is stopped.

In an embodiment, the controller 40 may be further connected with the third switch K3, and further configured to switch on the third switch K3 to charge the battery module 10 when the electric vehicle is running.

In an embodiment, the power supply system further includes a diode D1 connected in reverse parallel with the third switch K3.

As shown in FIG. 2, in an embodiment, each of the first switch K1 and the third switch K3 is configured as an NMOS transistor, and the second switch K2 is configured as a relay.

A working process of the power supply system is provided in details as following.

When the electric vehicle is started, the controller 40 switches on the second switch K2 and switches off the first switch K1. At this time, the first DC/DC converter 20 does not work, and only the second DC/DC converter 30 starts to work. The second DC/DC converter 30 converts the voltage of 48V outputted from the second positive electrode c of the battery module 10 to 14V for supplying power to low-voltage apparatuses. Because the output voltage of the second DC/DC converter 30 is larger than the first voltage, that is, a voltage of 14V outputted from the output terminal 32 of the second DC/DC converter is greater than a voltage of 12V outputted from the first electrode b, the diode D1 connected in reverse parallel with the third switch K3 is not conducted. Therefore, the second DC/DC converter 30 cannot charge the battery module 10, and can charge the low-voltage apparatuses only.

When the electrical vehicle is running and the second DC/DC converter 30 fails to work (that is, there is no output from the second DC/DC converter 30), the diode D1 is conducted, and a voltage of 12V outputted from the first positive electrode b is supplied to the low-voltage apparatuses through the diode D1, which guarantees the low-voltage apparatuses work properly, thus protecting the driver. Thus, when the second DC/DC converter 30 fails to work, a power-off of the power supply system can be avoided. The power supply system according to the present disclosure has advantages of high safety and high reliability.

When the electrical vehicle is running, the controller 40 switches on the third switch K3 to charge some batteries in the battery module 10, for example, to charge batteries between the first positive electrode b and the negative electrode a, so as to compensate for the electric quantity consumed by outputting the voltage of 12V from the first positive electrode b when the second DC/DC converter 30 fails to work, thereby balancing the electric quantities of batteries in the battery module 10.

When the electric vehicle is stopped, the controller 40 switches off the second switch K2 and switches on the first switch K1. At this time, the first DC/DC converter 20 starts to work, and the second DC/DC converter 30 does not work. Since an output of the first DC/DC converter 20 is separately connected with a low power consumption load such as an alarm, when the electrical vehicle is stopped, the first DC/DC converter 20 still works to supply power to the low power consumption load, thus avoiding the power-off of the power supply system. Furthermore, the second DC/DC converter 30 does not work when the electric vehicle is stopped, thus reducing static losses, prolonging a discharging time of the battery module 10, reducing the cost and having the advantages of energy saving and environment protection.

With the power supply system and the method for controlling the power supply system according to embodiments of the present disclosure, when the second DC/DC converter fails to work, a power-off of the power supply system can be avoided. Furthermore, by providing two DC/DC converters, static losses can be reduced. In other words, the power supply system according to the present disclosure has advantages of high safety and high reliability. In addition, a lithium iron phosphate battery module can be used in the power supply system, thus increasing an energy density of the power supply system, realizing a high output power, a high temperature resistance, a long service life, non-pollution and low cost, and improving a user's driving experience.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A power supply system for an electric vehicle, comprising:

a battery module having a negative electrode, a first positive electrode and a second positive electrode, wherein the first positive electrode is configured to output a first voltage, the second positive electrode is configured to output a second voltage, and the second voltage is greater than the first voltage;
a first DC/DC converter having an input terminal connected with the second positive electrode;
a second DC/DC converter having an input terminal connected with the second positive electrode;
a first switch connected between the second positive electrode and the first DC/DC converter;
a second switch connected between the second positive electrode and the second DC/DC converter; and
a third switch connected between the first positive electrode and an output terminal of the second DC/DC converter; and a controller, connected with the first switch and the second switch respectively, and configured to switch on the second switch and switch off the first switch when the electric vehicle is started or running, and to switch off the second switch and switch on the first switch when the electric vehicle is stopped.

2. The power supply system of claim 1, wherein the controller is further connected with the third switch, and further configured to switch on the third switch to charge the battery module when the electric vehicle is running.

3. The power supply system of claim 1, wherein each of the first switch and the third switch is configured as an NMOS transistor, and the second switch is configured as a relay.

4. The power supply system of claim 3, further comprising a diode connected in reverse parallel with the third switch.

5. The power supply system of claim 4, wherein an output voltage of the second DC/DC converter is greater than the first voltage.

6. The power supply system of claim 5, wherein an input voltage of the second DC/DC converter ranges from about 30V to about 60V, and the output voltage of the first DC/DC converter is 14V.

7. The power supply system of claim 1, wherein the battery module is configured as a lithium iron phosphate battery module.

8. The power supply system of claim 1, wherein an operating power of the first DC/DC converter is smaller than an operating power of the second DC/DC converter.

9. The power supply system of claim 1, wherein the first voltage is 12V, and the second voltage is 48V.

10. The power supply system of claim 1, wherein an input voltage of the first DC/DC converter ranges from about 30V to about 60V, and an output voltage of the first DC/DC converter is 14V.

11. A method for controlling a power supply system for an electric vehicle, wherein the power supply system comprises:

a battery module having a negative electrode, a first positive electrode and a second positive electrode, in which the first positive electrode is configured to output a first voltage, the second positive electrode is configured to output a second voltage, and the second voltage is greater than the first voltage;
a first DC/DC converter having an input terminal connected with the second positive electrode;
a second DC/DC converter having an input terminal connected with the second positive electrode;
a first switch connected between the second positive electrode and the first DC/DC converter;

a second switch connected between the second positive electrode and the second DC/DC converter; and a third switch connected between the first positive electrode and an output terminal of the second DC/DC converter, and wherein the method comprises:

switching on the second switch and switching off the first switch when the electric vehicle is started or running; and switching off the second switch and switching on the first switch when the electric vehicle is stopped.

12. The method of claim 11, further comprising:

switching on the third switch to charge the battery module when the electric vehicle is running.

13. The method of claim 12, wherein the third switch is configured as an NMOS transistor.

14. The method of claim 11, wherein the first switch is configured as an NMOS transistor, and the second switch is configured as a relay.

* * * * *